Patented Aug. 17, 1926.

1,596,279

UNITED STATES PATENT OFFICE.

LUDOLF J. J. LINDEMANN, OF ALTONA-BAHRENFELD, GERMANY, ASSIGNOR TO THOMAS PERCIVAL HODGE, OF PARK RIDGE, ILLINOIS.

PROCESS FOR MAKING FRESH YEAST LASTING.

No Drawing. Application filed September 15, 1924, Serial No. 737,912, and in Germany March 4, 1924.

It is well known in the prior art that fresh yeast is washed in large quantities of water in order to remove the particles of dirt contained therein and that in carrying out this washing process, cold water has been employed of as low a temperature as possible. Yeast, obtained from molasses and washed in such a manner, will, after a period of 24 hours, develop a brown rim and send forth a sour smell and yeast obtained from corn often assumes a bluish-gray colour and will not keep for any length of time.

I have found that these disadvantages are due to an excess of glycogen (a reserve-substance contained in the cells of the yeast) in conjunction with particles of dirt and that if the amount of glycogen contained in the yeast is reduced or totally removed, the brown edges of the molasses-yeast and the bluish-gray colour of the corn-yeast will not be produced, and the yeast increases its lasting capacity by weeks, increasing at the same time its germinating power.

Wholly apart from the question of washing at low temperatures, it is a well known fact that glycogen in yeast will be caused to ferment at higher teperatures, that is to say at temperatures of more than 25 degrees centigrade, and this will take place to a still greater extent when air is admitted to the yeast. This is the cause of the molasses-yeast forming very rapidly the dirty brown edges and of the corn-yeast assuming the bluish-gray colour when the yeast is stored in a warm place which frequently cannot be avoided.

By the use of this invention, these difficulties can be wholly avoided by, in manufacturing, washing the finely distributed, usually but not necessarily fresh, yeast in sufficient quantities of warm water of at least 33 degrees and at the utmost of 43 degrees centigrade for a sufficient length of time until with the aid of the iodine or other conventional test it can then be proved, that the amount of glycogen contained in the yeast has considerably decreased. During this treatment, the yeast solution is gently agitated mechanically or by air. It is still better practice to carry out the process until glycogen disappears altogether.

According to a great number of experiments made, the addition of sugar or sugar-containing substances, in such small quantities that the yeast cannot bud, to the wash water in conjunction with the heat will cause the yeast to give off its glycogen more rapidly than where plain water is used. Yeast prepared in such a manner can even be sent to the tropics without changing its appearance or decreasing its germinating power.

According to a great number of experiments made, I have found that the addition of lime water, soda water or other alkalies hastens the removal of the glycogen in a better manner and in quicker time and thus makes the yeast durable for the drying process. In fact, in pursuing the matter, I have found that lime which, moreover, can be replaced by soda or other chemicals reacting in an alkali manner, is very important for the production of dried yeast.

After the addition of the sugar and water, as mentioned above, a slight fermentation is produced by the yeast thus being treated. In about fifteen minutes, the sugar commences to disintegrate into alcohol and carbonic gas and at that moment, at the latest, the lime water is to be added to the liquid, which, in the meantime, is being stirred constantly.

The lime water prevents, not only every increase of acid, but also induces the yeast to deliver up quickly its glycogen. If the process takes place at a cold temperature, the addition of lime water is to be spread over a longer period, so that the fermenting liquid has constantly a supply of lime water, for the removal of the glycogen takes naturally correspondingly longer. Only by the application of high temperature can the process be carried into effect quickly. At a cold temperature, namely 20° to 30° C., the removal of the glycogen, by aid of lime water and simultaneous presence of sugar, lasts up to twelve hours, while, at a temperature of 33° to 43° C., the glycogen, after the lime water has been added, may easily be removed from the yeast in an hour's time, or less.

One satisfactory way of producing the result, according to my present invention, the same being a modification of my co-pending application, No. 655,524, is as follows: The lime water may be prepared in the usual manner by adding to an excess of lime water, allowing the solution to clarify and using the clear part of this saturated solution. In one receptacle, 1½ parts of sugar are dissolved in 40 parts of water at a temperature of 38° C. In another receptacle, 100 parts of compressed yeast are dissolved in 1160 parts of water at a temperature of 38° C., the solution being continually gently agitated mechanically or by air. Then ⅓ of the above sugar solution is added. 15 minutes after the starting point, the second ⅓ of the sugar solution is added and 8 parts of lime water. 30 minutes after starting, the last of the sugar solution is added. The solution is continually gently agitated and the temperature of 38° C. maintained. The treatment lasts until suitable tests show substantial or complete removal of the glycogen. (All parts stated above are by weight.)

Having thus described my invention, what I claim as new and desire to secure by Letters Patent is:

1. The herein described method of making fresh yeast lasting consisting in washing finely distributed fresh yeast in alkaline water of from 33 to 43° C., until tests show the substantial to complete removal of glycogen.

2. The herein described method of making fresh yeast lasting consisting in washing finely distributed fresh yeast in alkaline water of from 33 to 43° C., containing sugar substances, until tests show the substantial to complete removal of glycogen.

3. The herein described method of making fresh yeast lasting consisting in washing finely distributed fresh yeast in water of from 33 to 43° C., containing sugar substances and lime water, the lime water being added in proportion of 8 parts lime water to 100 parts compressed yeast suspended in 1160 parts water at 38° C., and the washing continuing until tests show the substantial to complete removal of glycogen.

4. The herein described method of making fresh yeast lasting consisting in washing finely distributed fresh yeast in lime water of from thirty-three to forty-three degrees centigrade until tests show the substantial to complete removal of glycogen.

5. The herein described method of making fresh yeast lasting consisting in washing finely distributed fresh yeast in lime water containing sugar substances of from thirty-three to forty-three degrees centigrade until tests show the substantial to complete removal of glycogen.

In witness whereof, I have hereunto subscribed my name.

LUDOLF J. J. LINDEMANN.